Jan. 30, 1962 YOSHIKI FUJIHARA 3,018,703
JOINT SEALING DEVICE
Filed May 23, 1958 2 Sheets-Sheet 2
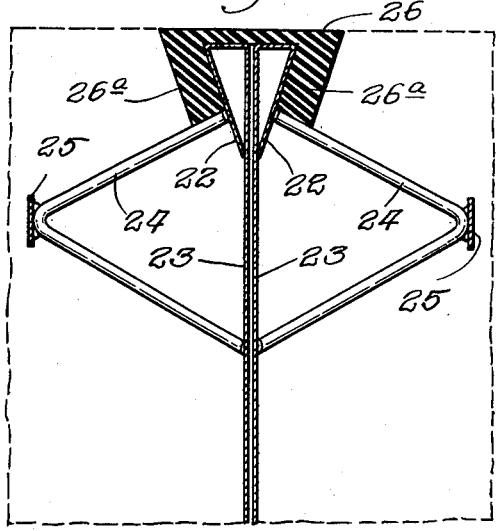
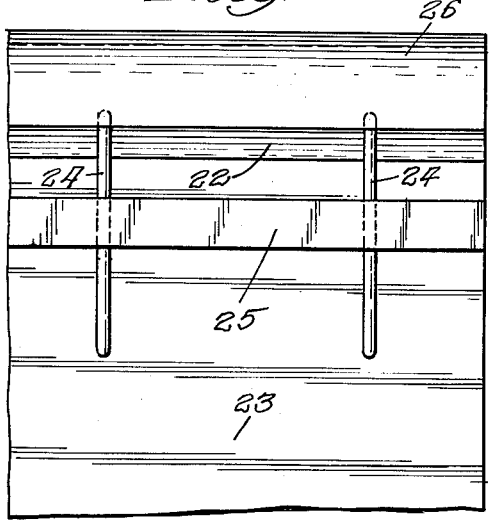
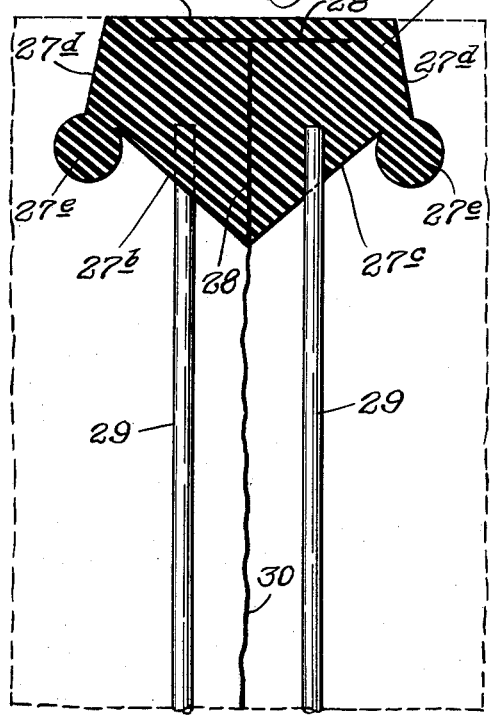
Inventor:
Yoshiki Fujihara,
By Schneider, Hofgren,
Brady & Wegner, Attys.

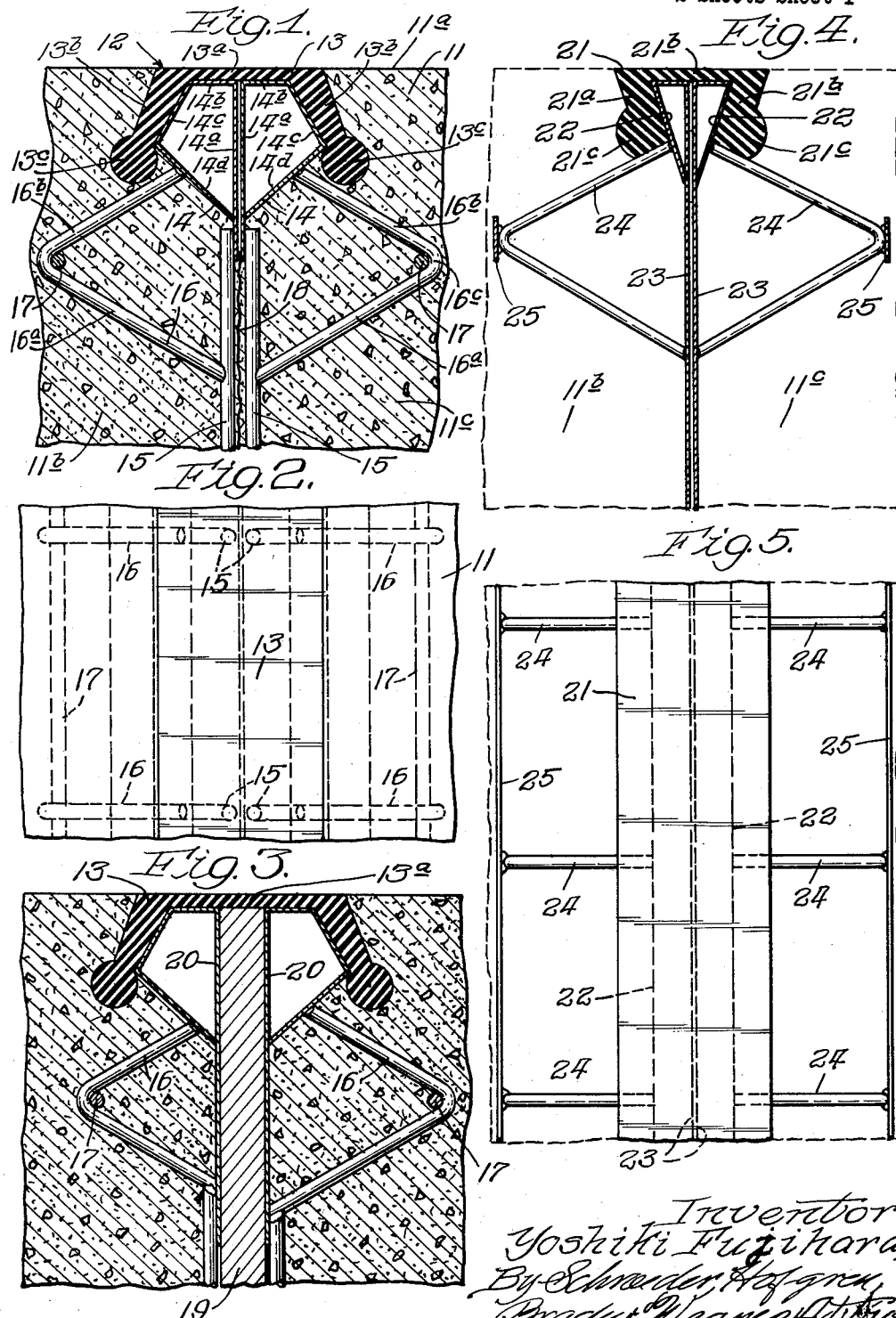

United States Patent Office 3,018,703
Patented Jan. 30, 1962

3,018,703
JOINT SEALING DEVICE
Yoshiki Fujihara, Lyons, Ill., assignor to Servicised Products Corporation, a corporation of Delaware
Filed May 23, 1958, Ser. No. 737,274
3 Claims. (Cl. 94—18)

This invention relates to a joint sealing device for a masonry joint having bodies of masonry such as concrete on opposite sides of the joint.

One feature of this invention is to provide an improved joint sealing device for a masonry joint having bodies of masonry on opposite sides of the joint comprising a sealing member having a resilient joint spanning portion and side portions on opposite sides of said spanning portion adapted to engage the masonry bodies on opposite sides of the joint, and means including filler members normally connecting said side portions securely to the masonry bodies and aiding in supporting said joint spanning portion to prevent substantial yielding of said side portions away from the bodies and substantial inward displacement of said spanning portion upon relative lateral movement of said bodies toward and away from each other.

Another feature is to provide an improved joint sealing device for a masonry joint having bodies of masonry on opposite sides of the joint comprising a sealing member having a resilient joint spanning portion and side portions on opposite sides of said spanning portion adapted to engage the masonry bodies on opposite sides of the joint, said side portions being spaced from each other and extending generally downwardly from opposite sides of said spanning portion, relatively movable filler members within the space between said spanning portion and side portions, and means normally connecting said filler members securely to the masonry bodies to prevent substantial yielding of said side portions away from the bodies upon relative lateral movement of said bodies toward and away from each other.

Other features and advantages of this invention will be apparent from the following description of the invention taken in conjunction with the accompanying drawings. Of the drawings:

FIGURE 1 is a fragmentary vertical sectional view through a masonry mass with one embodiment of the joint sealing device;

FIGURE 2 is a fragmentary plan view of the structure of FIGURE 1;

FIGURE 3 is a view similar to FIGURE 1 but illustrating a second embodiment of the invention;

FIGURE 4 is a view similar to FIGURE 1 but illustrating a third embodiment;

FIGURE 5 is a fragmentary plan view of the structure of FIGURE 4;

FIGURE 6 is a view similar to FIGURE 1 but showing a fourth embodiment of the invention;

FIGURE 7 is a side elevational view of the structure of FIGURE 6; and

FIGURE 8 is a view similar to FIGURE 1 but illustrating a fifth embodiment of the invention.

In the embodiment of FIGURES 1 and 2, there is provided a mass of concrete 11 as in a concrete road having a smooth upper surface 11a. Imbedded in this concrete 11 is a joint sealing device 12 embodying the invention. This device includes a rubber joint seal 13 having an essentially flat, relatively thin central part 13a with a top surface approximately flush with the surface 11a of the concrete 11.

The seal 13 also includes side portions in the form of downwardly diverging wings 13b extending away from the central part 13a and into the concrete 11. The lower edges of these wings are provided with enlarged sections 13c. These enlarged sections are imbedded substantially completely in the concrete 11 and serve to aid in locking the lower parts of the seal embodying the portions 13b and 13c securely in place within the concrete.

The space on the inside of the rubber seal 13 bounded by the top central part 13a and diverging wings 13b is substantially filled by a pair of box-like filler members 14 which may be made of metal or other strong material. Each filler 14 includes a central strip 14a, a top strip 14b beneath one side of the central part 13a of the rubber seal, an upper side strip 14c located tightly against the inner surface of one wing 13b, and a lower side strip 14d extending between the bottom of the strip 14c and the bottom of the central strip 14a. As can be seen, the two bottom strips 14d extend downwardly and toward each other. Also the two central strips 14a are normally closely adjacent to each other.

Before pouring the concrete 11, the joint sealing device including the rubber seal 13 and fillers 14 are supported on spaced pairs of spaced supports 15. Thus where the concrete structure is a road these supports 15 may be held in place on the foundation of the road. Attached to each support 15 and extending outwardly therefrom is a V-shaped member 16 having the lower end of one leg 16a attached to a support 15 and the upper end of the other leg attached to a lower side strip 14d. Where the members 14, 15 and 16 are of metal, this attaching can be by welding if desired.

Extending between the plurality of V-shaped members 16 and located at the bight thereof is a rod 17 which may also be welded to the members 16.

The embodiment shown in FIGURES 1 and 2 is a contraction joint seal for the concrete 11. Thus as the concrete dries and shrinks, the joint sealing device serves to locate the crack 18 or cracks substantially beneath the device and to seal the concrete in this vicinity. With the construction of this invention, the central part or joint-spanning portion 13a is extended or stretched as the two concrete sections 11b and 11c move relatively away from each other as under low temperture conditions. During such movement each set of force applying members including the supports 15, members 16, and rods 17 move with the particular concrete section as these members are imbedded in the concrete. As the upper ends of the supports 15 and the members 16 are attached to the fillers 14 this movement also causes corresponding movement of the fillers. Thus the side wings 13b are always held in close sealing engagement with the respective section 11c of concrete 11 during all relative positions of the sections. In addition the enlarged edges 13c of the wings 13d aid in retaining the wings within the concrete sections 11b and 11c.

Because of the above described features and construction, the resultant of the pulling forces on the sides of the seal 13, here embodied as the wings 13b, are always greater than 90° but less than 180° with respect to the plane of the joint-spanning portion 13a. In the construction the outer sides of the wings 13b are always in a relatively great angle with respect to the adjacent concrete surface 11a so that a load on this adjacent portion of the surface will not cause breakage of the concrete.

In the embodiment shown in FIGURE 3, the structure is quite similar to that shown in FIGURES 1 and 2, but it is adapted to an expansion joint rather than a contraction joint. Here, a conventional filler strip 19 is provided between the two relatively movable adjacent side members 20 of the device. In this embodiment, the joint-spanning portion 13a of the seal 13 is pre-stretched during its installation, so that this portion will have less tendency to bulge upwardly during expansion of the concrete sections.

In the embodiment shown in FIGURES 4 and 5 the joint seal 21 is provided with side wings extending downwardly and generally toward each other as shown at 21a.

However, here again, there is a space between the wings 21a and the joint-spanning portion 21b that is substantially filled by similar box-like filler members 22 that are relatively movable toward and away from each other. These filler members, like the members 14 in the first embodiment, serve to hold the wings 21a securely against the concrete sections 11b and 11c during relative movement thereof toward and away from each other. The filler members 22, as in the previous embodiment, are provided with downwardly extending, substantially parallel, closely adjacent plate members 23 and these are securely tied to the corresponding sections of concrete by means of V-shaped members 24 similar to the members 16 in the previous embodiments. In this embodiment, however, the rods 17 are replaced by metal strips 25 that are also attached as by welding to the bights of the members 24.

The embodiment shown in FIGURE 6 is quite similar to that shown in FIGURES 4 and 5 except that here the side enlarged portions 21c of the embodiment of FIGURE 4 are omitted. Thus, in FIGURE 6 the outer surfaces of the wings 26a of the seal 26 are flat and smooth.

In the embodiment shown in FIGURE 8, the joint seal 27 is solid so that no fillers similar to the fillers 14, 20 and 22 of the previous embodiments are required. In place of this, the seal 27 is slit with a T-shaped slit to provide a relatively thin joint-spanning portion 27a at the one surface of the concrete in the manner of the previous embodiments and to provide two side portions 27b and 27c that are relatively movable with respect to each other. The side surfaces 27d of the seal slope downwardly and away from each other as do the side surfaces of the wings embodied at 13b in the first embodiment. In addition, these sides are provided with enlarged lower edge sections 27e that are securely imbedded in the concrete. The lower surface of the seal 27 between the enlarged sections 27e slope downwardly and toward each other so that there is no substantially sized inner cavity as is true of the previous seals. The joint 27 is supported in position prior to pouring the concrete by spaced pairs of spaced rods 29 located on opposite sides of the normal crack illustrated at 30. These rods also serve to aid in attaching the seal securely to the concrete.

The joint seal of this invention provides a secure seal for the joint, whether an expansion joint or a contraction joint, at all times. Thus, as the joint expands and contracts, caused by the relative movement of the concrete or other masonry sections, the sides of the seal, as embodied at 13b, 21a, 26a, 27b and 27c, move with the concrete sections and are securely retained against the sections. The central joint-spanning portion, being extensible and retractable, provides a seal at all times. The joint itself is made of a resilient elastic material such as natural or synthetic rubber or polyvinyl chloride or the like. The joint is so constructed that the forces of expansion on the joint are all concentrated at the relatively thin and normally horizontal joint-spanning portion.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:
1. A joint sealing device for a masonry joint having masonry bodies with outer surfaces on opposite sides of the joint, comprising: a sealing member having a stretchable joint spanning portion with an outer surface adjacent said masonry body outer surfaces and a pair of side portions on opposite sides of said spanning portion, said side portions and joint spanning portion having inner surfaces facing away from said outer surfaces and toward said masonry bodies; a pair of relatively movable filler members retained against said inner surfaces of said side portions with said spanning portion extending therebetween; means for attaching one of said filler members to one masonry body on one side of said joint to retain a sealing member side portion against said one masonry body; and means for attaching the other filler member to the other masonry body on the other side of said joint to retain the other side portion against said other masonry body, movement of said filler members away from each other on contraction of said masonry bodies thereby serving to stretch said joint spanning portion of said sealing member in tension, said filler members supporting said spanning portion on said inner surface thereof during said stretching to aid in preventing substantial inward displacement of said spanning portion.

2. A joint sealing device for a masonry joint having masonry bodies on opposite sides of the joint, comprising: a sealing member having a pair of side portions adapted to be located in said masonry bodies on opposite sides of said joint and a resilient stretchable joint spanning portion adapted to extend between said side portions and across said joint, said side portions and sealing portion having inner surfaces defining an inner cavity; a pair of filler members adapted to be located on opposite sides and having parts extending into said cavity to bear against said inner surfaces for supporting the respective portions in substantially fixed relation to said masonry bodies; means for attaching one of said filler members to one masonry body on one side of said joint to retain a sealing member side portion against said one masonry body; and means for attaching the other filler member to the other masonry body on the other side of said joint to retain the other side portion against said other masonry body, said bearing of said filler members against said spanning portion inner surface serving to aid in holding said spanning portion against substantial inward displacement to subject said spanning portion to tension forces on movement of said bodies relatively away from each other.

3. The device of claim 2 wherein said filler parts within said cavity are of hollow box-like construction.

References Cited in the file of this patent

UNITED STATES PATENTS

| | | |
|---|---|---|
| 2,198,084 | Jacobson | Apr. 23, 1940 |
| 2,220,628 | Stedman | Nov. 5, 1940 |
| 2,299,670 | Westcott | Oct. 20, 1942 |
| 2,431,385 | Fischer | Nov. 25, 1947 |
| 2,619,884 | Jacobson | Dec. 2, 1952 |